(12) United States Patent
Mendiratta et al.

(10) Patent No.: US 9,942,330 B2
(45) Date of Patent: Apr. 10, 2018

(54) SESSION MANAGER ANTI-LOOPING

(71) Applicant: Extreme Networks, Inc., San Jose, CA (US)

(72) Inventors: Harsh V. Mendiratta, East Brunswick, NJ (US); Stephen Andrew Baker, Arvada, CO (US); Alejandro Vaquero, Littleton, CO (US); Stephen R. Durney, Broomfield, CO (US); Ryan Scott Wallach, Westminster, CO (US); William G. Bahr, Broomfield, CO (US)

(73) Assignee: Extreme Networks, Inc., San Jose, CA (US)

( * ) Notice: Subject to any disclaimer, the term of this patent is extended or adjusted under 35 U.S.C. 154(b) by 538 days.

(21) Appl. No.: 14/254,465

(22) Filed: Apr. 16, 2014

(65) Prior Publication Data

US 2014/0317190 A1    Oct. 23, 2014

Related U.S. Application Data

(60) Provisional application No. 61/813,990, filed on Apr. 19, 2013.

(51) Int. Cl.
*G06F 15/16* (2006.01)
*H04L 29/08* (2006.01)
*H04L 29/06* (2006.01)

(52) U.S. Cl.
CPC .......... *H04L 67/14* (2013.01); *H04L 63/1416* (2013.01); *H04L 65/1006* (2013.01); *H04L 65/1076* (2013.01); *H04L 63/02* (2013.01)

(58) Field of Classification Search
CPC .......... H04L 12/28; H04L 12/50; H04L 12/56
See application file for complete search history.

(56) References Cited

U.S. PATENT DOCUMENTS

| | | | |
|---|---|---|---|
| 6,501,754 B1 * | 12/2002 | Ohba | H04L 49/309 370/389 |
| 8,014,299 B2 | 9/2011 | van Bemmel | |
| 2007/0177603 A1 * | 8/2007 | Calme | H04L 29/06027 370/395.2 |
| 2007/0268904 A1 * | 11/2007 | van Bemmel | H04L 45/00 370/392 |
| 2008/0267081 A1 * | 10/2008 | Roeck | H04L 47/10 370/249 |
| 2009/0103518 A1 * | 4/2009 | Yu | H04L 12/66 370/352 |

(Continued)

OTHER PUBLICATIONS

Rosenberg et al., "SIP: Session Initiation Protocol," Network Working Group Request for Comments: 3261, Jun. 2002, 202 pages.

*Primary Examiner* — Suraj Joshi
*Assistant Examiner* — Jaren M Means
(74) *Attorney, Agent, or Firm* — Haley Guiliano LLP

(57) ABSTRACT

Session Manager anti-looping creates a model that is an effective barrier to looping, efficiently identifying a loop condition by maintaining temporary individual call counters for header sets within temporal parameters and terminating the loop condition upon detection. The system provides an administrator with adjustable parameters for loop detection count and loop detection interval, thereby allowing protection against loop conditions, both inadvertent and intentional.

20 Claims, 5 Drawing Sheets

(56) References Cited

U.S. PATENT DOCUMENTS

| | | | |
|---|---|---|---|
| 2010/0238811 A1* | 9/2010 | Rune | H04L 12/66 370/248 |
| 2011/0090899 A1* | 4/2011 | Fedorov | H04M 3/51 370/352 |
| 2013/0185445 A1* | 7/2013 | Larkin | H04L 65/1016 709/228 |
| 2014/0029128 A1* | 1/2014 | Zhang | H03G 3/3052 360/46 |

* cited by examiner

SESSION MANAGER ANTI-LOOPING

CROSS REFERENCE TO RELATED APPLICATION

The present application claims the benefits of U.S. Provisional Application Ser. No. 61/813,990, filed Apr. 19, 2013, of the same title, to Mendiratta, et al., which is incorporated herein by this reference.

FIELD OF THE DISCLOSURE

The present disclosure is generally directed toward enterprise communications and particularly to methods for identifying and breaking loops in hybrid networks.

BACKGROUND

In network configurations, error conditions can cause serious problems. One particularly troublesome error condition is known as a call loop. The call loop is characterized by a call that is never connected nor released, thereby using resources indefinitely. The call loop can be caused by unintentional configuration problems or intentionally by a malicious person creating mischief or attempting to harm a network. A network that experiences one or more call loops can have performance issues because the loops can tie up resources. Without enough available resources, the network may slow down or become unusable.

Session Initiation Protocol (SIP) is a signaling communications protocol used in some networks that has a few built in mechanisms to break the call loop when it occurs. In a network that contains all SIP-enabled elements, SIP can detect and break a loop when a call dialog that is creating requests gets stuck in a loop. The mechanism has a User Agent Client (UAC) insert a Max-Forwards header (default value 70) in an initial call request. Each SIP proxy in the request path typically decrements the Max-Forwards header value by one. When the Max-Forwards value reaches zero, the request is rejected and the call loop is broken. As an optional anti-looping measure, the SIP proxies may also check whether the same request is a repeat by inspecting the contents of the Via header. However, when there are back-to-back user agents (B2BUA), a Protocol Interworking Gateway (IWG), and/or other non-SIP elements in a loop path, the Max-Forwards and Via headers cannot be relied on to detect the loop since not all elements in a network are pure SIP proxies. Non-SIP elements may not be capable of decrementing headers and/or inspecting the contents of headers for repeats. Call loops may not be discovered and broken or may not be detected at all when non-SIP elements are present.

SUMMARY

These and other needs are addressed by the various aspects, embodiments, and/or configurations of the present disclosure. Embodiments of the present disclosure are directed to a system and method that identifies and breaks a call loop in a hybrid network that includes SIP and non-SIP elements. The method allows customers to adjust parameters, including a timer and a counter, to detect loops with precision, thereby protecting network resources when routing issues or attacks threaten a network.

As used herein, a call loop is a call request that comes into a proxy, is forwarded, and is subsequently delivered back to the same proxy. When the request arrives a second time, a SIP message portion known as a Request-URI is identical to the first time the request was delivered to the proxy. The proxy makes identical processing decisions based on the unchanged header fields. Since the request keeps coming back to the proxy and the call is never fully processed, completed, and/or terminated, it becomes a call loop.

Looped or looping call requests are considered errors. In a SIP network, call loops are recognized by a Max-Forwards count decremented to zero, an Expires time having elapsed, and when the server finds itself in a Via list of the request, including the branch parameters. SIP call loops may negatively affect network performance with proxy reboots, call failures, loss of network efficiency, and degradation of resource availability as these are consumed as the call (or calls) are processed indefinitely. One non-limiting example of a SIP proxy is an Avaya Aura® Session Manager (SM) SIP Firewall (ASSET Proxy feature), a proxy enhanced with two new fields to detect and break the call loop based on management of an SIP message known as an INVITE.

A loop detection count and a loop detection interval field are provided to an administrator, providing protection against call loops. SIP INVITE requests with an identical header set including a Request Uniform Resource Identifier (R-URI), To, From, and P-Asserted-Identity (PAI) header fields received in a short interval are detected and categorized by a SIP firewall as looped calls (PAI header field is optional). If the number of incoming requests with the same combination of the R-URI, To, From, and PAI header values reaches the loop detection threshold within the loop detection threshold interval, Avaya Aura® Session Manager (SM) can reject the INVITE request.

With adjustable loop detection count and loop detection interval fields, a hybrid network that contains SIP and non-SIP elements can be significantly better protected against call loop conditions, both inadvertent and intentional.

These and other advantages will be apparent from the disclosure.

In some embodiments, a method is provided that generally comprises:

maintaining a loop count threshold for a communication server;

receiving a first message at the communication server;

determining one or more element values contained in the first message;

comparing the one or more element values contained in the first message with historical element values included in messages previously received at the communication server;

based on the comparison step, determining that the one or more element values contained in the first message match one or more element values from a message previously received at the communication server and in response thereto incrementing a loop count value that is also maintained for the communication server;

determining that the loop count threshold has been at least one of met and exceeded by the loop count value;

in response to determining that the loop count threshold has been at least one of met and exceeded by the loop count value, determining that a call loop has occurred, and executing one or more functions at the communication server to break the call loop.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "user," "customer," or "client" denotes a party patronizing, serviced by, or otherwise doing business with a contact center and/or an enterprise business.

The phrase "SIP user agent (UA)" is a logical network endpoint used to create or receive SIP messages and manage a SIP session. The SIP UA can perform the role of a User Agent Client (UAC), which sends SIP requests, and a User Agent Server (UAS), which receives the requests and returns a SIP response.

A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multi-value, semantic, and other database designs.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
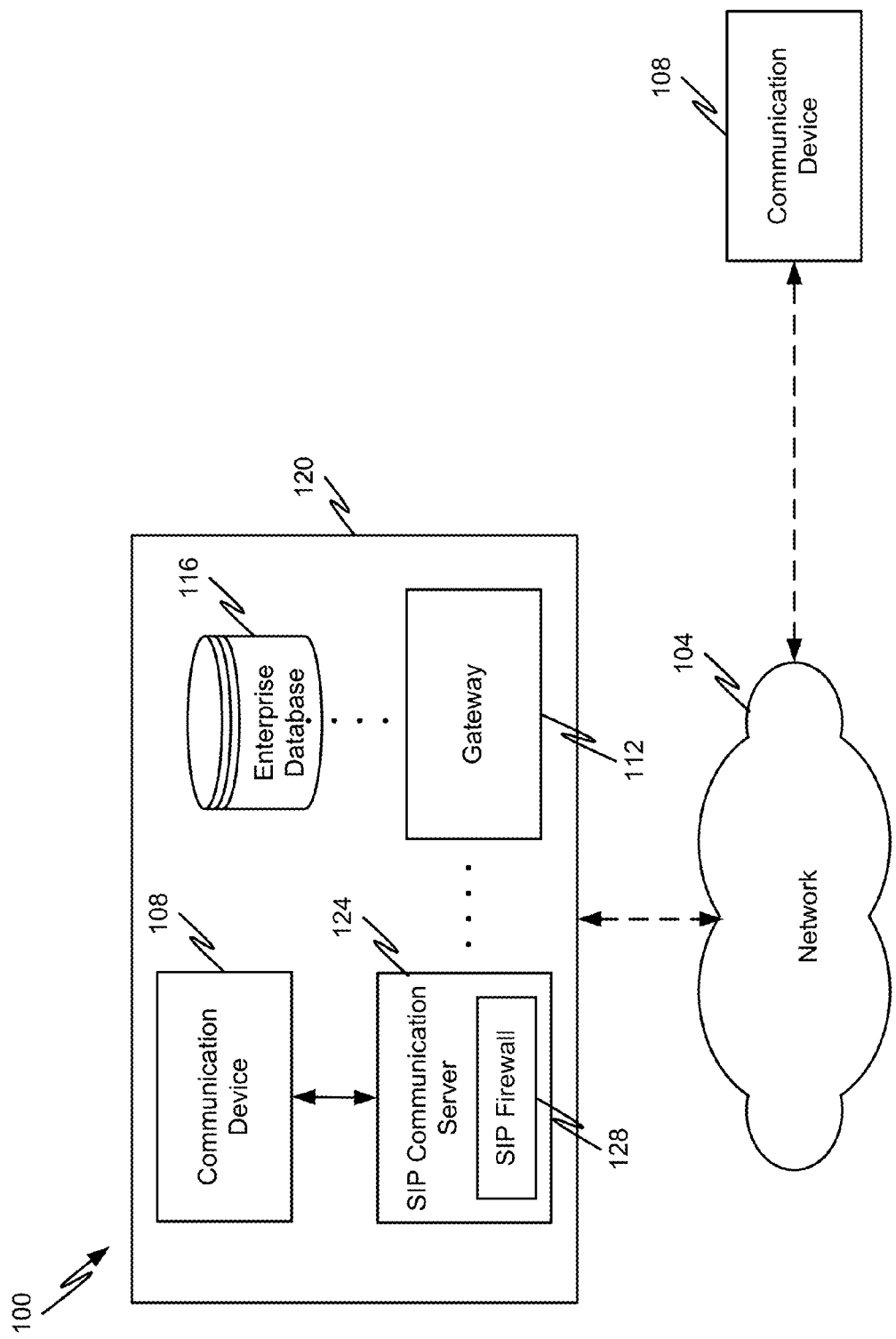
FIG. 1 is a block diagram of a communication system in accordance with embodiments of the present disclosure.

FIG. 1 is a block diagram of a communication system 100 in accordance with at least some embodiments of the present disclosure. The communication system 100 is depicted as including an enterprise network 120 that is connected to one or more external communication devices 108 via a communication network 104. Components of the enterprise network 120 are depicted as including a communication server 124 containing a SIP firewall 128, one or more communication devices 108, an enterprise gateway 112, and an enterprise database 116. It should be appreciated that one or more of the components depicted as being within the enterprise network 120 may alternatively or additionally be provided outside the enterprise network 120.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The external communication devices 108 are generally referred to as external because they are either not under the direct control of the enterprise administering the enterprise network 120 or have a decreased level of trust with the enterprise network 120 as compared with communication devices 108 that are within the enterprise network 120. Exemplary types of external communication devices 108 include, without limitation, cellular telephones, laptops, tablets, Personal Computers (PCs), digital telephones, analog telephones, wireless and Bluetooth devices, and the like.

The communication devices 108 within the enterprise network 120, similar to the external communication devices 108, may correspond to user communication devices and, in some embodiments, may include, without limitation, a telephone, a softphone, a cellular telephone, a multi-speaker communication device (e.g., conference telephone), a video telephone, a PC, a laptop, a tablet, a smartphone, a thin client, or the like. It should be appreciated that a communication device 108 may be configured to support single or multi-user interactions with other communication devices 108 within and outside of the enterprise network 120 corresponding to a single user agent (UA) and/or multiple UAs of enterprise users.

The communication devices 108 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 104 and/or within the enterprise network 120.

The enterprise network 120 may correspond to either a single-location enterprise network or a multi-location enterprise network. A single-location enterprise network may comprise a Local Area Network (LAN) that includes wired (e.g., Ethernet) and/or wireless (e.g., Wi-Fi) technologies. A multi-location enterprise network may comprise a Wide Area Network (WAN), which connects a plurality of LANs or similar network locations via one or more un-trusted networks, such as the communication network 104.

Specifically, while the enterprise network 120 is depicted as having a single communication server 124, it should be appreciated that some enterprise networks 120 may comprise a plurality of communication servers 124 and each of those servers may be authoritative for (e.g., provide services for) a subset of enterprise users. In such a scenario, messages received will be routed to the appropriate communication server 124.

In some embodiments, the communication server 124 may be used to help establish communication sessions and/or move signaling paths, change call topology, etc. within the enterprise network 120. Specifically, the communication server 124 may include a Private Branch eXchange (PBX), an enterprise switch, an enterprise server, combinations thereof, or any other type of telecommunications system switch or server. The communications server 124 is, in some embodiments, configured to execute telecommunication functions such as the suite of Avaya Aura® applications of Avaya, Inc., including but not limited to Communication Manager™, Communication Manager Branch Edition™, Avaya IP Office™, Session Manager™, System Manager™, MultiVantage® Express™, and combinations thereof.

In accordance with at least some embodiments, the communication server 124 can receive a call request. Once the communication server 124 receives a call request for a user, the communication server 124 passes the communication-establishing message (e.g., an INVITE message) to a first application in the application sequence, thereby allowing the first application to determine the parameters of the communication session, insert itself into the control and/or media stream of the communication session, and thereby bind itself to the communication session. The communication server 124 may contain or be connected to a SIP firewall 128. The SIP firewall 128 may one element of an enterprise's application layer security. The SIP firewall 128 may allow or deny access to SIP messages coming into the enterprise network 120 and may keep track of headers and other message information.

Additional servers 124 may include any other type of server or switch needed for operating the enterprise network 120. Examples of suitable other servers include, without limitation, Presence servers, Instant Messaging (IM) servers, email servers, voicemail servers, virtual machines, web servers, call center servers, Interactive Voice Response (IVR) units, etc.

An enterprise database 116 may be any type of database, such as relational, hierarchical, object-oriented, and/or the like. The database 116 may be external as depicted or internal to the communication server 124. The communication server 124 may communicate with the database 116. The communication server 124 is operable to take requests from communication devices 108, gateways 112, and other servers 124. A request in the form of a query or subscription may be sent from the communication server 124 to the database 116. Subscriptions and queries may retrieve data from the database 116 and results may be returned to the communication server 124 or other servers 124.

A gateway 112 may be required by an enterprise to provide on-premise transparent Network Address Translation (NAT) control. NAT translation is a network protocol that may be used to allow multiple enterprise devices to connect to a public network. The gateway 112 may translate embedded private addresses into appropriate public addresses (and vice versa for incoming packets). The gateway 112 may be operable to communicate with any element within the enterprise network 120, including but not limited to communication devices 108, communication servers 124, enterprise databases 116, and the like. The gateway 112 may translate all internal enterprise IP addresses to a public address to be used when communicating with the communication network 104 or any other public or private network.

Figure 2:
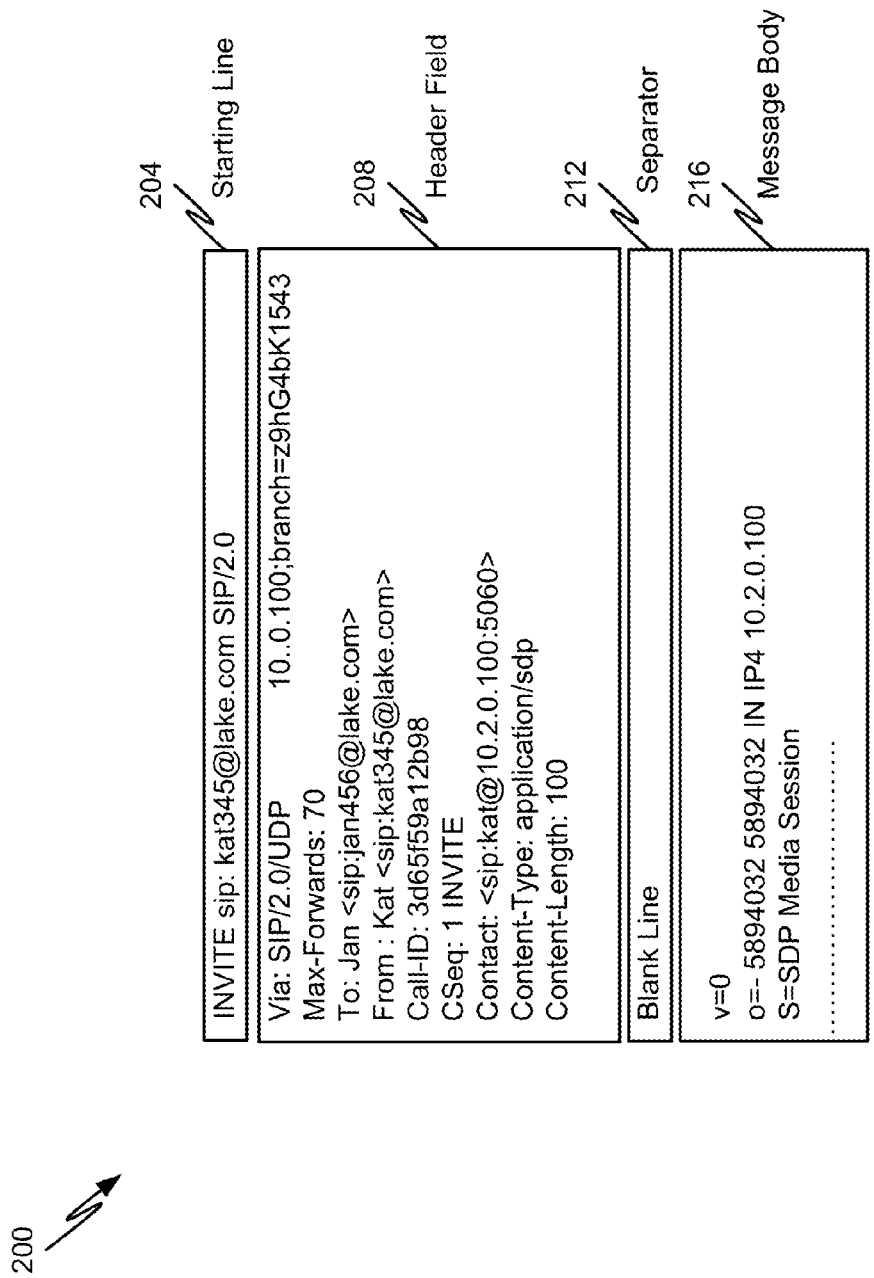
FIG. 2 is an example of a SIP message in accordance with embodiments of the present disclosure.

With reference to FIG. 2, an illustrative SIP message 200 is described in detail in accordance with embodiments of the present disclosure. SIP is a text-based protocol with two types of SIP messages—requests and responses. The starting or first line of a request 204 may include a method, a Request-Uniform Resource Identifier (URI), and a protocol version designation (e.g., SIP/2.0). A method may define the nature of the request, which may include such methods as REGISTER, INVITE, ACK, CANCEL, BYE, OPTIONS, PRACK, and INFO. The Request-URI may indicate where the request should be sent, typically used to identify a web resource (e.g., kat345@lake.com). The starting or first line of a response may include a response code (e.g., provisional 1xx gives progress; final 2xx, 3xx, 4xx, 5xx, 6xx terminate transaction).

The second part of a SIP message may contain header fields 208. Header fields 208 may convey attributes and modify message meaning, in the format of <name>:<value> (e.g., Via, Max-Forwards, To, From, Call-ID, CSeq, Contact, Content-Type, Content Length, etc.). Header fields may appear once or more than once in a message. A Via header field may contain one or more addresses of previous elements through which the message has passed. A To header field may indicate or specify a user who is being invited to a session. A From header field may indicate a user who originated the session request. A Call-ID header field may contain a globally unique identifier for the call. A CSeq header field may be a command sequence that identifies the transaction. A Contact header field may indicate a location for the originating user. Content-Type and Content-Length header fields may specify type of body (e.g., Session Description Protocol-SDP) and number of bytes in the body, respectively.

A blank line is a separator 212 that may indicate the end of SIP header fields and the beginning of a message body 216. Within the message body 216, there may be one or more request lines within the message where v may indicate a version of SDP (e.g., v=0), o may indicate owner information, session ID, session version address type and address (e.g., o=−5894032 5894032 IN IP4 10.2.0.100), and a media description may provide a type, port, or possible formats a caller may send and receive (e.g., S=SDP Media Session). Additional information regarding SIP header fields and field values can be found in RFC 3261, the entire contents of which are hereby incorporated herein by reference.

Figure 3:
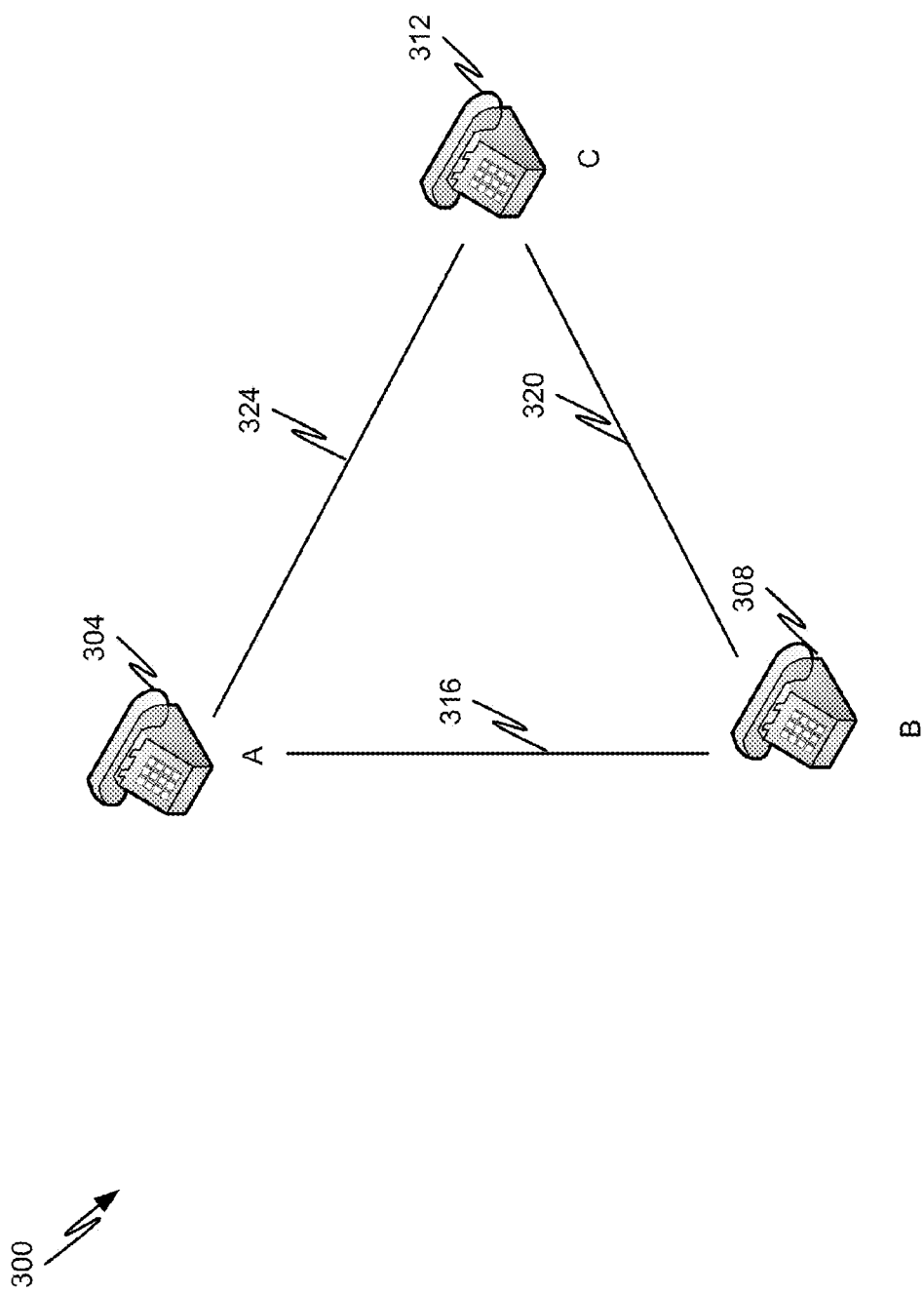
FIG. 3 is an example of a call loop in accordance with embodiments of the present disclosure.

FIG. 3 is an example of a call loop 300 in which features of call loop detection and termination will be described in accordance with at least some embodiments of the present disclosure. Specifically, FIG. 3 depicts a first call topology where a first user (e.g., User A 304) is involved in a first communication session 316 with a second user (e.g., User B 308). A second communication session 324 may be established, and an attempt may be made to initiate a third communication session 320 with User C 312. Although not depicted, other users may be involved in the first communication session 316 and may be transferred into the first communication session 316 at User A 304, at User B 308, or via a centralized conference bridge.

In a non-limiting example of a call loop, User A 304 may be at extension 1000. User A 304 may call User B 308 who may be at extension 1002. This can be an internal call on the same communication server 124, and the call can be routed and connected without issues. User A 304 may decide to ask User C 312 a question that User A 304 can't answer for User B 308. User C 312 may be administered on a second communication server 124 as extension 1001. When User A 304 calls User C 312, there is no local match on 1001, but the request may match to 1xxx on the second communication manager 124. Extension 1001 may be found on the second communication manager 124, and the communication session 324 may be correctly routed and connected without issues. User A 304 tells User B 308 that he should talk to User C 312 directly and provides the extension for User C 312 rather than initiating a transfer. Unfortunately, User B 308 accidentally writes down that the extension for User C 312 is 1003 (instead of 1001). User B 308 may initiate a call to what he thinks is the extension for User C 312, but is actually an extension that does not exist. Extension 1002 (User B) calls extension 1003 and there is no local match. The request may be sent to the next communication server 124, and there may be no match. The second communication server 124 may send the request back to the first communication server 124, and a loop is created. The communication servers 124 may send the request back and forth until User B 308 terminates the call. If any elements in the path are non-SIP elements, traditional methods may not terminate the loop. The same concept can apply when User A 304, User B 308, and/or User C 312 is outside of the enterprise network 120.

To avoid the call loop, an administrator can administer the session manager anti-loop detection of the present disclosure using two new parameters, loop count threshold and loop detection interval. In a communication system 100, the two new fields may be enabled for call loop detection and may be displayed for use by an administrator on a management user interface on a communication server 124. If the default value of the parameter loop count threshold is 0, it indicates the loop detection is turned off. The allowed range may be 0-10,000. The default value of the parameter loop detection interval may be set to 100 msec. The allowed range may be 10 msec-10,000 msec. Since the frequency of call loops is a function of latency and is dependent on the number of the network elements in a loop path, an administrator can fine-tune loop detection parameters to meet the particular needs of the enterprise, specific to a network configuration.

The administrator can modify these parameters on each communication server 124 and may have the option to adjust and test the loop count threshold and loop detection interval parameters to suit the particular needs of the network 120. Though the administrator can set the loop detection interval as low as 10 msec, it can be expected that the administrator may choose to set the interval in multiples of 100 msecs. If an extremely small loop detection is set, it may create unnecessary performance overhead and not detect a loop.

A consideration when administering the loop detection interval may be how many elements a call loop goes through and the sum of the propagation delays introduced by each element. In a non-limiting example, a call loop arrives at a communication server 124 at a hypothetically aggressive interval of 25 msec, where the cumulative propagation delay of intermediate hops is 25 msec or less and the administrator wants to break the loop after the fifth instance of the same call. The administrator may set the configuration to a loop count threshold=5 and a loop detection interval=200 msec. If the administrator set the loop count=2 and the loop detection interval<50 msec, the call loop would not be detected. Typically, the most aggressive rate of call loops is 12 loop attempts per second (~84 msec), and the administrator can set the parameters appropriately for the risk and for the network. Some trial and error once the new parameters have been set may be necessary for optimizing loop detection.

To identify call loops, the SIP firewall 128 can maintain temporary individual call counters for each unique combination of the R-URI, To, From, and PAI header values of incoming requests. Upon receiving an Out of Dialog (OOD) INVITE request, the SIP firewall 128 may check to see if a counter already exists for the header values combination. If not, a new counter may be instantiated. The loop counter may be incremented with each OOD INVITE request. If the loop counter equals the administered INVITE loop threshold, the OOD INVITE request may be rejected.

For the two URIs to be equal, components including user, password, host, and port must match. Specifically, a SIP URI is defined as a string, where brackets indicate optional components:

sip:user[:password]@host[:port]

The user component is the portion of the string between the first ':' after 'sip' and either the second ':' or the '@' character. Other components, including the detection parameters, may not be considered for comparison purposes. Loop call counters shall be removed when the loop count is equal to the administered loop threshold count and/or the loop threshold interval timer expires.

Using the new parameters, once the loop count threshold and the loop detection interval are reached, a 603 Decline (The destination does not wish to participate in the call, or cannot do so, and additionally the client knows there are no alternative destinations (such as a voicemail server) willing to accept the call) or a 604 Does Not Exist Anywhere (The server has authoritative information that the requested user does not exist anywhere) may be sent to User B 308 and resources may be released.

Figure 4:
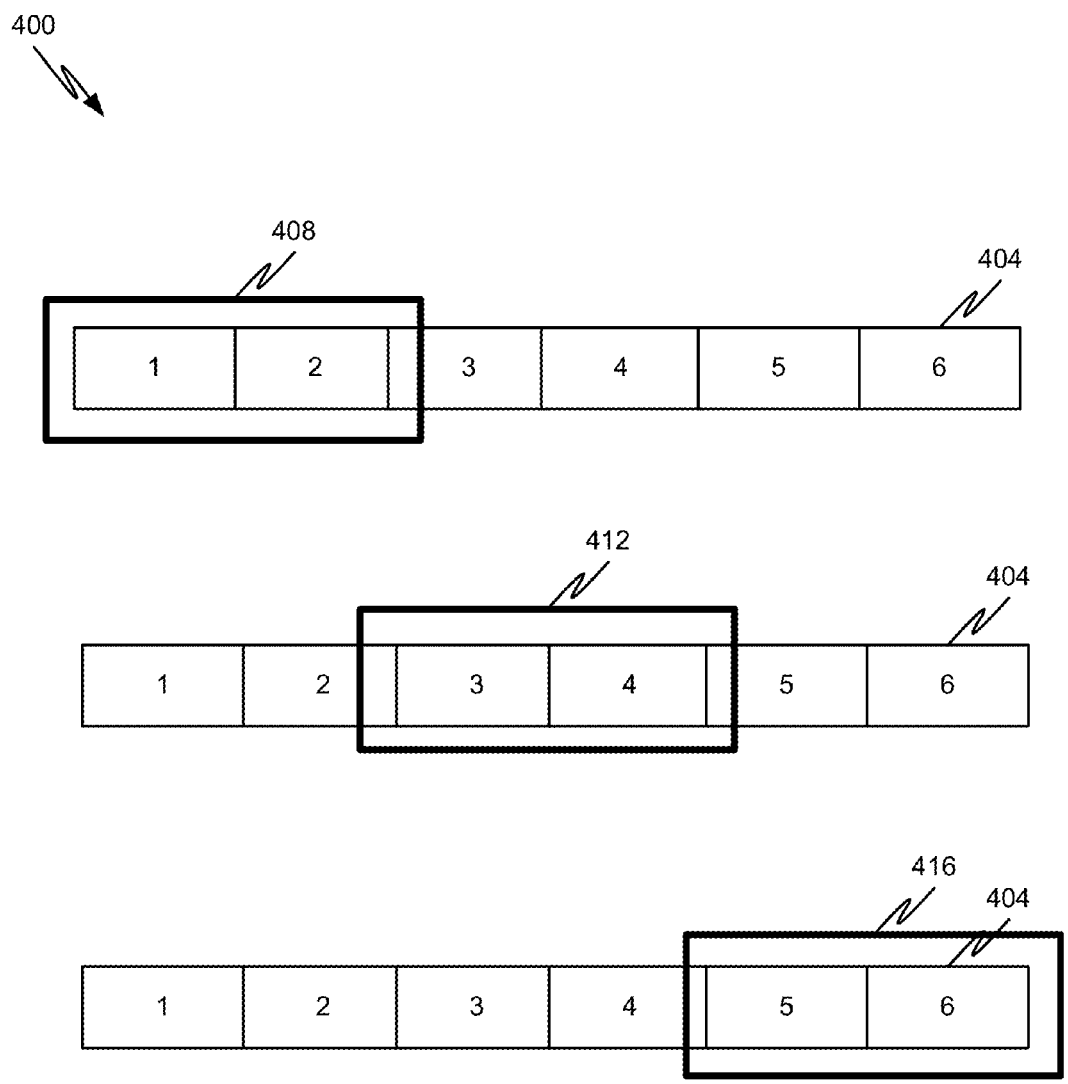
FIG. 4 is an example of a sliding window in accordance with embodiments of the present disclosure.

FIG. 4 is an example of a sliding window 400 used in accordance with embodiments of the present disclosure. A sliding window protocol can be used in packet-based data transmission networks. Sliding window protocols may be used where reliable delivery of packets in order is required, such as in the Data Link Layer (OSI model) as well as in the Transmission Control Protocol (TCP).

In a non-limiting example, packet 1, packet 2, packet 3, packet 4, packet 5, and packet 6 may be transmitted as one or more SIP messages 404 from a communication device 108. A dark black box depicts a window size, which in this example contains two packets. The window size may include a number of packets (one or more) that can be sent prior to receiving an acknowledgment (ACK) that the packets have been received. In a sliding window model, the ACK may be sent for multiple packets in one window 408 (e.g., packet 1 and packet 2). The ACK may also contain information regarding buffer size, directing how many packets should be in the next transmission. If too many packets come in at once and the buffer is overrun, the number of packets sent at once may be decreased or may cease for a specified interval. If the packets can be processed faster, a larger window may be requested and provided.

When packet 1 and packet 2 of SIP message 404 are received, the ACK may be sent by the communication server 124. Once the ACK is received, packet 3 and packet 4 may be sent in one window 412. When packet 3 and packet 4 of SIP message 404 are received, the ACK may be sent by the communication server 124. Once the ACK is received, packet 5 and packet 6 may be sent in one window 416. When packet 5 and packet 6 of SIP message 404 are received, the ACK may be sent by the communication server 124. As shown, the sliding window can move and optionally be adjusted as each prior packet set is acknowledged. By using a sliding window mechanism, the SIP firewall 128 may efficiently check count threshold and interval threshold, providing this information to the communication server 124 for use by the administrator to protect any network, whether it is all-SIP or contains non-SIP elements, from call loops.

Figure 5:
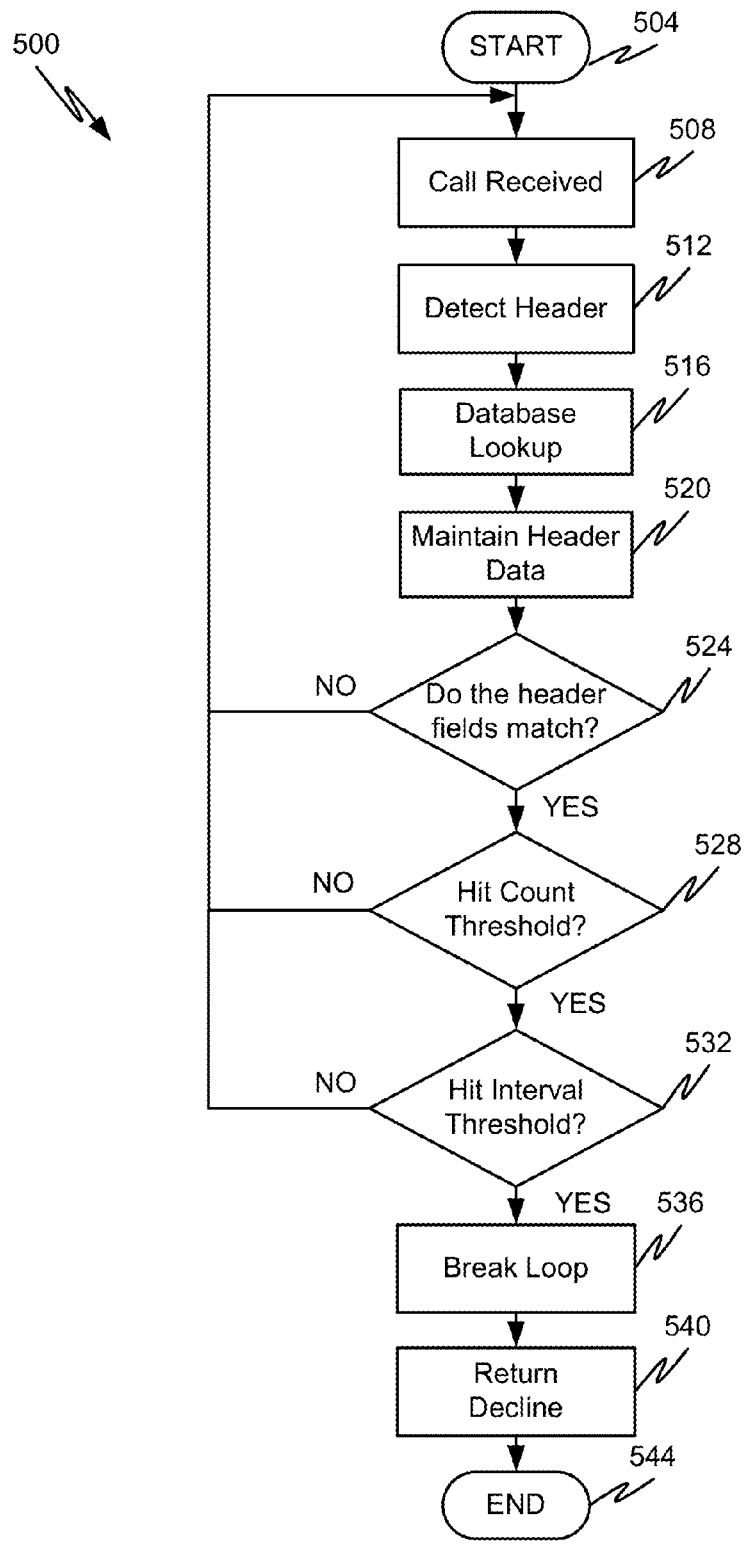
FIG. 5 is a flow diagram for call loop analysis and termination in accordance with embodiments of the present disclosure.

The method 500 for call loop analysis and termination in accordance with embodiments of the present disclosure is shown in FIG. 5. Generally, the method 500 begins with a start operation 504 and terminates with an end operation 544. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 500 shall be explained with reference to the systems, components, modules, software, data structures, etc. described in conjunction with FIGS. 1-4.

The method begins at step 504 and continues when a call is received in step 508 by an enterprise network 120 or initiated within the enterprise network 120. When the call is processed by a communication server 124, communication elements may be considered. In a non-limiting example, a SIP communication server 124 receives a SIP call from a communication device 108. The SIP call contains standard SIP header 200 components. The communication server 124 detects the SIP header 200, in step 512. As described in detail in FIG. 2, the SIP header 200 may contain element values such as Via, Max-Forwards, To, From, Call-ID, CSeq, Contact, Content-Type, and Content-Length. In step 516, the SIP firewall 128 within the SIP communication server 124 may initiate a database lookup to see if any header elements match headers from previous call requests. The SIP firewall 128 may record and maintain the header data for the current call (step 520). The SIP firewall 128 may initiate a comparison of header fields to see if the current header fields match any previous call header fields, in step 524. If there is no match to previous call requests, the method returns to the start until another call is received, in step 508.

If the SIP firewall 128 determines that there is a header match to one or more previous call requests in step 524, the SIP firewall 128 may check to see if a new count threshold set by an administrator has been reached (step 528). If the count threshold is not reached, the method returns to the start until another call is received, in step 508. If the count threshold is reached, the SIP firewall 128 may check to see if a new interval threshold set by an administrator compared to a system clock provided by an operating system has been reached (step 532). If the interval threshold is not reached, the method returns to the start until another call is received, in step 508. If the interval threshold is reached, the SIP firewall 128 may determine that a loop is indicated by the count threshold and interval threshold having been reached. The SIP firewall 128 may break the loop in step 536. A decline (e.g., 603 Decline, 604 Does not exist) may be sent to a call originator (step 540). Once the decline message has been sent, the call attempt can be terminated, releasing resources that were consumed by the call loop. The method ends, in step 544.

When a network contains mixed SIP and non-SIP elements, adjustable loop detection count and loop detection interval parameters can be used to detect hybrid network loops with precision, protecting resources when routing issues and/or malicious attacks occur.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
   maintaining, by a microprocessor, a loop count threshold for a communication server;
   receiving, by the microprocessor, a first message at the communication server;
   determining, by the microprocessor, a plurality of element values contained in the first message;
   comparing, by the microprocessor, the plurality of element values contained in the first message with historical element values included in messages previously received at the communication server;
   based on the comparison step, determining, by the microprocessor, that the plurality of element values contained in the first message match a plurality of element values from a message previously received at the communication server and in response thereto, incrementing a loop count value that is also maintained for the communication server, wherein the first message and the message previously received are Session Initiation Protocol (SIP) messages and wherein the microprocessor maintains a temporary individual loop count value for each unique combination of the plurality of element values;
   determining, by the microprocessor, that the loop count threshold has been at least one of met or exceeded by the loop count value; and
   in response to determining that the loop count threshold has been at least one of met or exceeded by the loop count value, determining, by the microprocessor, that a call loop has occurred.

2. The method of claim 1, further comprising:
   executing, by the microprocessor, one or more functions at the communication server to break the call loop.

3. The method of claim 2, wherein the communication server breaks the call loop by declining the first message.

4. The method of claim 3, wherein breaking the call loop by declining the first message comprises sending a SIP 603 Decline message.

5. The method of claim 3, wherein breaking the call loop by declining the first message comprises sending a SIP 604 Does Not Exist Anywhere message.

6. The method of claim 2, wherein the communication server breaks the call loop by terminating a call attempt associated with the first message.

7. The method of claim 1, wherein the plurality of element values contained in the first message correspond to header elements contained in the SIP message.

8. The method of claim 7, wherein every header element of the first message is required to match every header element of the message previously received at the communication server before determining that the call loop has occurred.

9. The method of claim 1, further comprising:
   determining an amount of time between receiving the first message and the message previously received at the communication server;
   comparing the determined amount of time with an interval threshold maintained for the communication server; and
   only in response to determining that the interval threshold has been at least one of met and exceeded by the determined amount of time, determining that the call loop has occurred.

10. The method of claim 9, wherein the interval threshold is set based on how many elements values the call loop has gone through and a sum of the propagation delays introduced by each element value.

11. The method of claim 1, wherein the message previously received is a first Out-of-Dialog INVITE request with the matched plurality of elements values and wherein the first message is a second Out-of-Dialog INVITE with the matched plurality of element values.

12. The method of claim 1, wherein one of the plurality of element values is a SIP Uniform Request Identifier that comprises a user, a password, a host, and a port.

13. A communication system, comprising:
    a microprocessor; and
    a hardware computer readable medium, coupled with the microprocessor and comprising microprocessor readable and executable instructions that program the microprocessor to execute:
    a SIP firewall that maintains a loop count threshold for a communication server and performs the following operations:
    receive a first message at the communication server;
    determine a plurality of element values contained in the first message;
    compare the plurality of element values contained in the first message with historical element values included in messages previously received at the communication server;
    based on the comparison step, determine that the plurality of element values contained in the first message match a plurality of element values from a message previously received at the communication server and in response thereto incrementing a loop count value that is also maintained by the SIP firewall for the communication server, wherein the first message and the message previously received are Session Initiation Protocol (SIP) messages and wherein the microprocessor maintains a temporary individual loop count value for each unique combination of the plurality of element values;
    determine that the loop count threshold has been at least one of met and exceeded by the loop count value;

in response to determining that the loop count threshold has been at least one of met and exceeded by the loop count value, determine that a call loop has occurred; and execute one or more functions at the communication server to break the call loop.

14. The system of claim 13, wherein the communication server breaks the call loop by declining the first message, and wherein the communication server breaks the call loop by terminating a call attempt associated with the first message.

15. The system of claim 13, wherein the plurality of element values contained in the first message correspond to header elements contained in the SIP message, and wherein every header element of the first message is required to match every header element of the message previously received at the communication server before determining that the call loop has occurred.

16. The system of claim 13, wherein the SIP firewall further performs the following operations:

determine an amount of time between receiving the first message and the message previously received at the communication server;

compare the determined amount of time with an interval threshold maintained by the SIP firewall for the communication server; and only in response to determining that the interval threshold has been at least one of met and exceeded by the determined amount of time, determine that the call loop has occurred.

17. The system of claim 13, wherein the message previously received is a first Out-of-Dialog INVITE request with the matched plurality of elements values and wherein the first message is a second Out-of-Dialog INVITE with the matched plurality of element values.

18. The system of claim 13, wherein one of the plurality of element values is a SIP Uniform Request Identifier that comprises a user, a password, a host, and a port.

19. The system of claim 13, wherein, wherein breaking the call loop by declining the first message comprises one of sending a SIP 603 Decline message or sending a SIP 604 Does Not Exist Anywhere message.

20. A method, comprising:

maintaining, by a microprocessor, a loop count threshold for a communication server;

receiving, by the microprocessor, a first message at the communication server;

determining, by the microprocessor, one or more element values contained in the first message;

comparing, by the microprocessor, the one or more element values contained in the first message with historical element values included in messages previously received at the communication server;

based on the comparison step, determining, by the microprocessor, that the one or more element values contained in the first message match one or more element values from a message previously received at the communication server and in response thereto incrementing a loop count value that is also maintained for the communication server, wherein the loop count value is based on a sliding window of the message previously received at the communication server;

determining, by the microprocessor, that the loop count threshold has been at least one of met and exceeded by the loop count value; and in response to determining that the loop count threshold has been at least one of met and exceeded by the loop count value, determining, by the microprocessor, that a call loop has occurred.

* * * * *